United States Patent [19]

Shah et al.

[11] Patent Number: 5,018,131

[45] Date of Patent: May 21, 1991

[54] OPTICAL SWITCH

[75] Inventors: Govind Shah, Princeton Junction; Peter A. Basile, West Windsor; Ralph H. Carmen, Lebanon, all of N.J.; Stephen A. Deschaine, Garland, Tex.

[73] Assignee: DSC Communications Corporation, Plano, Tex.

[21] Appl. No.: 316,987

[22] Filed: Feb. 28, 1989

[51] Int. Cl.$^5$ .............................................. H04J 14/00
[52] U.S. Cl. ..................................... 370/1; 350/96.15; 455/600
[58] Field of Search ............... 455/600, 605, 606, 607, 455/609, 610, 611, 612, 613, 617; 370/1, 34; 340/825.81, 825.82; 350/96.15

[56] References Cited

U.S. PATENT DOCUMENTS

| | | | |
|---|---|---|---|
| 3,611,359 | 10/1971 | Panerai | 350/96.15 |
| 4,011,543 | 3/1977 | Soref | 455/612 |
| 4,830,452 | 5/1989 | Orley | 350/96.15 |

FOREIGN PATENT DOCUMENTS 2201561  9/1988  United Kingdom ................ 455/612

OTHER PUBLICATIONS

Oda, "Mechanically Operated Optical Switch", Fujitsu Sci. and Tech., vol. 17, #3, 9-'81, pp. 121-138.
Minowa, "Nonblocking 8×8 Optical Matrix Switch for Fiber Optics Communications", IEEE, 4-80.

Primary Examiner—Reinhard J. Eisenzopf
Assistant Examiner—L. Van Beek
Attorney, Agent, or Firm—Baker & Botts

[57] ABSTRACT

A switch (10) which uses optical signals propagating through an air media is disclosed. Transmitters (14a-14n) radiate light along projection openings (40) through a solid, opaque housing (12). The projection openings (40) parallel each other and substantially reside in a lower plane (32) within the housing (12). Periscopic plugs (30) reflect such light upward along an intermediate direction (38) within the plugs (30) and out from the plugs (30) into incidence openings (42). The incidence openings (42) parallel each other and substantially reside in an upper plane (34) within the housing (12). Optical receivers (16a-16n) receive light propagating in the incidence openings (42). The incidence openings (42) reside substantially perpendicular to the projection openings (40).

13 Claims, 2 Drawing Sheets

OPTICAL SWITCH

TECHNICAL FIELD OF THE INVENTION

The present invention generally relates to the field of telecommunications. More specifically, the present invention relates to telecommunication networks which utilize optical media for the transmission of data.

BACKGROUND OF THE INVENTION

Increasing volumes of data traffic are being transported from one place to another using optical media, such as optical fibers. One of the many advantages of an optical media is that it may transport a greater volume of data traffic in a given period of time than may be transported electrically over coaxial or other wire-oriented cables. However, this greater volume of data traffic presents problems in the portions of telecommunication networks that process or otherwise manipulate data traffic rather than simply transport it.

A telecommunication switch processes telecommunication data traffic by connecting data received at any one of many input ports to any one of many output ports. Many different architectures and techniques for building telecommunication switches are known to those skilled in the art. However, conventional switches utilize electrical components, such as memory devices, in performing the switching. Although the bandwidth of such electrical components roughly accommodates the data traffic volumes achievable with electrical media, such conventional switches are not easily adapted to process the data traffic volumes supported by optical media. If conventional switching networks were adapted to process the volume of data traffic provided by fiber optical data links, such resulting networks would be extremely large and expensive. In addition, the extremely large size suggests that poor reliability would result.

Consequently, a need exists for a telecommunication switch which reliably and inexpensively switches such large data traffic volumes. However, conventional telecommunications switches which employ fiber optic components do not meet these needs. Such switches require many critical, switchable, fiber optic terminations and junctions. The current state of fiber optic technology cannot reliably and inexpensively produce such items.

SUMMARY OF THE INVENTION

Accordingly, it is an advantage of the present invention that an improved telecommunication switch which uses an air medium for the optical transmission of data is provided.

Another advantage of the present invention is that an improved telecommunications switch which is inexpensive and reliable is provided.

Yet another advantage of the present invention is related to using structures which minimize cross talk, tolerate a large amount of optical signal divergence, and tolerate a large amount of optical signal loss.

The above and other advantages of the present invention are carried out in one form by an optical switch which utilizes a housing that has a plurality of optical transmitters and a plurality of optical receivers mounted thereon. A line of projection is associated with each of the optical transmitters, and a line of incidence is associated with each of the optical receivers. The transmitters and receivers are mounted to the housing so that each of the lines of incidence crosses each of the lines of projection within the interior of the housing. Moreover, a reflector demountably couples to the housing at one of the points where a line of incidence crosses a line of projection to reflect light from one of the lines of projection to one of the lines of incidence.

BRIEF DESCRIPTION OF THE DRAWINGS

A more complete understanding of the present invention may be derived by referring to the detailed description and claims when considered in connection with the accompanying drawings wherein like reference numbers refer to similar items throughout the drawings, and:

DETAILED DESCRIPTION OF THE PREFERRED EMBODIMENT

Figure 1:
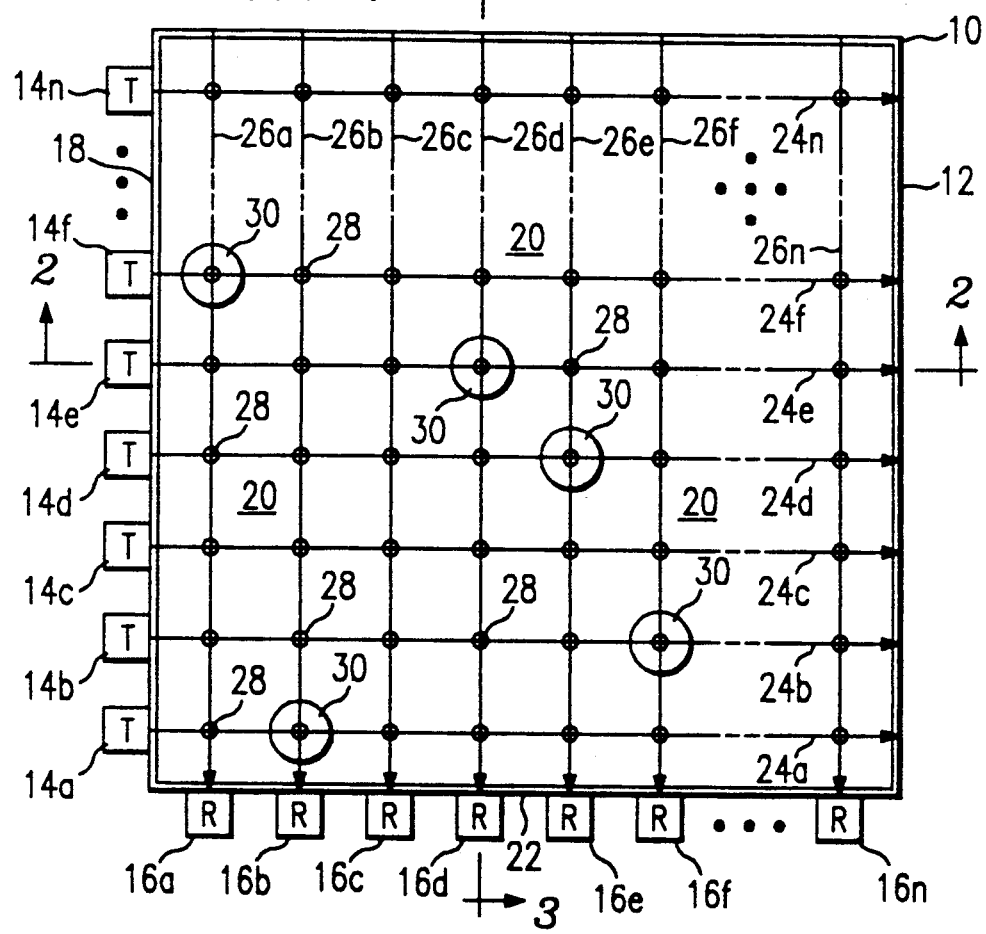
FIG. 1 shows a schematic top view of an optical switch constructed according to the present invention.

FIG. 1 shows a schematic top view of an optical switch 10 constructed in accordance with the teaching of the present invention. Switch 10 represents a communications device which concurrently routes signals appearing at a plurality of switch input ports to a plurality of switch output ports. Moreover, any input port may be connected to any output port. The present switch specifies which particular one of the input ports connects to a particular one of the output ports. The present invention represents an optical switch which optically routes signals from input ports to output ports.

Optical switch 10 includes a generally square-shaped housing 12, a plurality of optical transmitters 14a, 14b, 14c, 14d, 14e, 14f, and so on through 14n, and a plurality of receivers 16a, 16b, 16c, 16d, 16e, 16f, and so on through receiver 16n. The quantity of transmitters 14a-14n and of receivers 16a-16n is not a critical feature in the present invention. However, the preferred embodiment connects 400-600 input ports to an equivalent number of output ports using a structure that fits within a standard 23 inch relay rack.

Optical transmitters 14a-14n are each mounted on a first side 18 of housing 12. Moreover, optical transmitters 14a-14n are mounted on side 18 so that light emanating therefrom radiates into an interior 20 of housing 12. In the preferred embodiment of the present invention, optical transmitters 14a-14n are each conventional optical transmitters, such as laser diodes, which are driven from conventional sources (not shown). Optical transmitters 14a-14n reside at the input ports of optical switch 10.

Optical receivers 16a-16n are mounted on a second side 22 of housing 12. Second side 22 resides substantially perpendicular to first side 18 of housing 12. Moreover, receivers 16a-16n mount to second side 22 so that light propagating from interior 20 of housing 12 toward second side 22 of housing 12 impinges thereon. In the preferred embodiment of the present invention, optical receivers 16a-16n represent conventional optical detectors which compatibly operate with optical transmitters 14a-14n and which drive conventional sources (not shown). Optical receivers 16a-16n reside at the output ports of optical switch 10.

Each of transmitters 14a-14n transmits light along lines of projection 24a-24n, respectively. Light produced by transmitters 14a-14n may diverge from lines of projection 24a-24n. However, lines of projection 24a-24n are the axes along which such light propagates. Lines of projection 24a-24n are each substantially perpendicular to side 18 of housing 12, are each parallel to side 22 of housing 12, and extend into interior 20 of housing 12 from transmitters 14a-14n, respectively. Lines of projection 24a-24n result from the orientation of transmitters 14a-14n, which are mounted on side 18 of housing 12.

In addition, lines of incidence 26a-26n are associated with receivers 16a-16n, respectively. Light propagating along lines of incidence 26a-26n maximizes signal output from optical receivers 16a-16n. In the preferred embodiment of the present invention, each of lines of incidence 26a-26n resides substantially parallel to first side 18 of housing 12 and perpendicular to second side 22 of housing 12. Moreover, lines of incidence 26a-26n extend from interior 20 of housing 12 toward side 22 of housing 12. Lines of incidence 26a-26n result from the orientation of receivers 16a-16n, which are mounted on side 22 of housing 12.

Consequently, lines of propagation 24a-24n are substantially perpendicular to lines of incidence 26a-26n. Moreover, each of lines of propagation 24a-24n crosses each of lines of incidence 26a-26n at a cross point 28. As a result, one cross point 28 exists for each possible combination of a transmitter 14a-14n and a receiver 16a-16n. In addition, within housing 12 lines of projection 24a-24n and lines of incidence 26a-26n define paths of propagation which contain an air media. In other words, light propagating along lines of projection 24a-24n and along lines of incidence 26a-26n travels substantially through air.

Plugs 30 are reflective devices which reside at selected cross points 28. Plugs 30 serve two functions in the present invention. First, plugs 30 reflect light propagating along lines of projection 24a-24n so that such light propagates along lines of incidence 26a-26n after being reflected. In addition, plugs 30 demountably couple to housing 12 so that the connection definition for switch 12 may change by moving a plug 30 from one of cross points 28 to another of cross points 28.

Consequently, plugs 30 may reside at any of cross points 28. However, no more than the quantity N, where N equals the lesser of the number of transmitters 14a-14n or of receivers 16a-16n, of plugs 30 are coupled to housing 12 at any given instant in time. The quantity N of plugs 30 are coupled to housing 12 so that only one of plugs 30 is associated with each of lines of propagation 24a-24n. Moreover, only one of plugs 30 is associated with each of lines of incidences 26a-26n. Of course, less than the quantity N of plugs 30 may be coupled to housing 12 when less than the entire number of possible connections are to be made.

Figure 2:
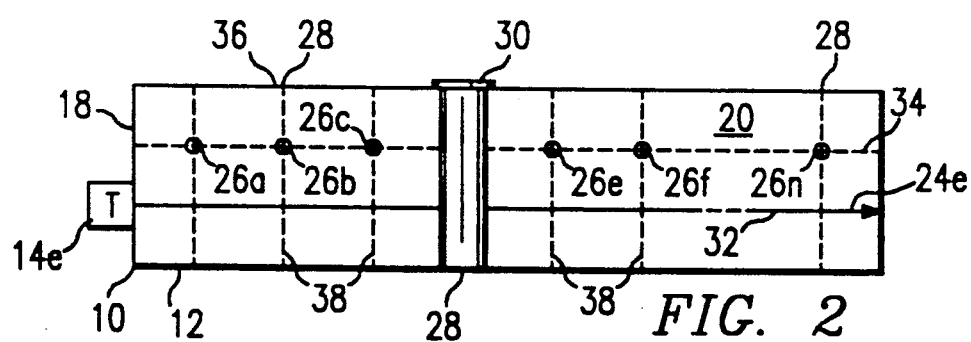
FIG. 2 shows the schematic side view of the present invention defined by line 2—2 in FIG. 1.
Figure 3:
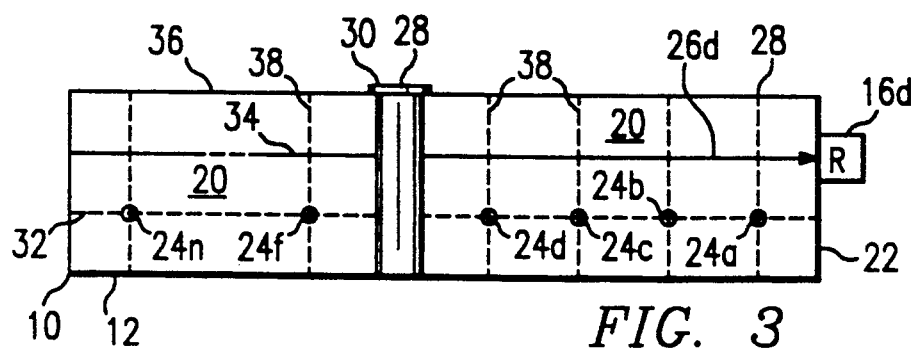
FIG. 3 shows the schematic side view of the present invention defined by line 3—3 in FIG. 1.

FIG. 1 shows a two-dimensional view of optical switch 10. However, optical switch 10 is a three-dimensional structure, and the third dimension is illustrated in the schematic side views presented in FIGS. 2 and 3. FIG. 2 depicts the side view of optical switch 10 taken at line 2—2 of FIG. 1, and FIG. 3 depicts the side view taken at line 3—3 of FIG. 1. Thus, FIGS. 2 and 3 illustrate cross-sectional side views of optical switch 10 which are perpendicular to each other.

Referring to both FIGS. 2 and 3, the preferred embodiment of the present invention mounts transmitters 14a-14n so that lines of projection 24a-24n all reside substantially within a lower plane 32. Of course, the side view depicted by FIG. 2 shows only transmitter 14e and line of projection 24e. Thus, in FIG. 2 plane 32 is depicted by line of projection 24e. However, the side view illustrated in FIG. 3 shows lines of projection 24a-24n as colinear points. Consequently, in FIG. 3 the dotted line which connects the colinear points represents lower plane 32.

In addition, receivers 16a-16n are mounted on side 22 of housing 12 so that lines of incidence 26a-26n reside in an upper plane 34. FIG. 2 illustrates upper plane 34 as a dotted line which connects colinear points that represent lines of incidence 26a-26n. The side view shown in FIG. 3 illustrates only receiver 16d and line of incidence 26d. Thus, FIG. 3 represents upper plane 34 as line of incidence 26d.

In the preferred embodiment, upper plane 34 resides a first predetermined distance below an upper surface 36 of housing 12, and lower plane 32 resides a second predetermined distance below top surface 36. Moreover, planes 32 and 34 are spaced apart and parallel to each other. The use of separate planes for the propagation of light in lines of projection 24a-24n and lines of incidence 26a-26n provides advantages in reducing cross talk, as is discussed below.

FIGS. 2 and 3 shows one of plugs 30 located at a cross point 28 in which line of incidence 26d crosses line of projection 24e. Lines of incidence 26a-26n do not intersect lines of projection 24a-24n since such lines reside in spaced apart planes. However, a cross point 28 is defined by the points on a line of projection 24a-24n and a line of incidence 26a-26n where an intermediate line 38 may be drawn so that it is perpendicular to both the line of projection 24a-24n and the line of incidence 26a-26n. Thus, FIGS. 2 and 3 illustrate cross points 28 as intermediate lines 38 which are perpendicular to lines of projection 24a-24n and lines of incidence 26a-26n.

Since lines of projection 24a-24n reside in a separate plane from lines of incidence 26a-26n, plug 30 is a periscopic device which first reflects light away from line of projection 24e, upwards along one of intermediate lines 38 in the example presented in FIGS. 2 and 3. Next, plug 30 reflects light away from the one of intermediate lines 38 along line of incidence 26d.

Figure 4:
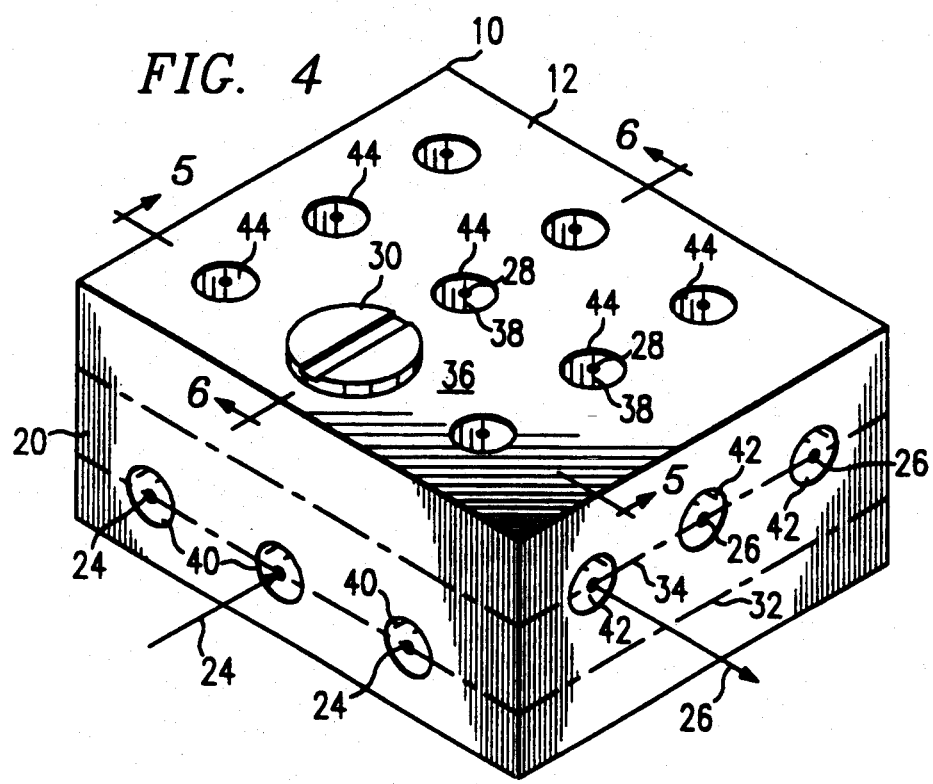
FIG. 4 shows a projection view of a portion of an optical switch constructed according to the teaching of the present invention.
Figure 5:
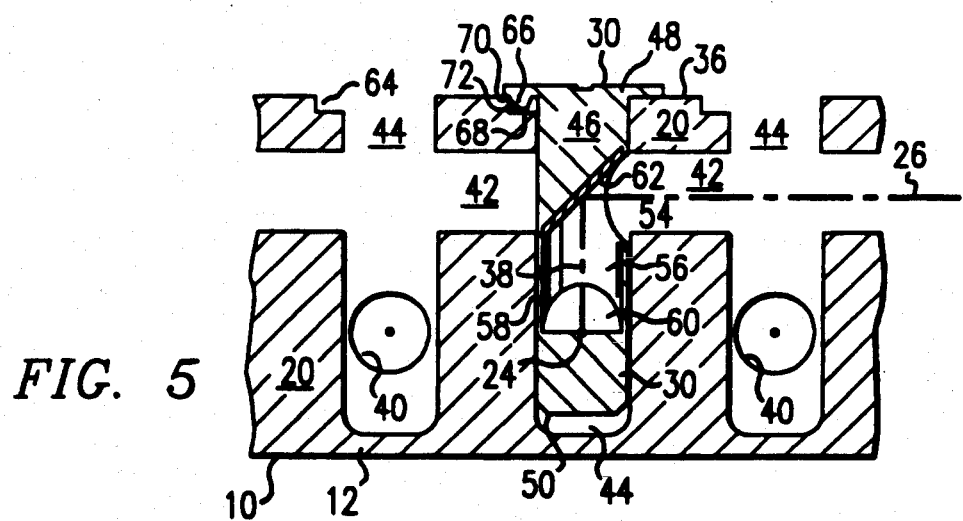
FIG. 5 shows the cross-sectional side view of the present invention defined by line 5—5 in FIG. 4.
Figure 6:
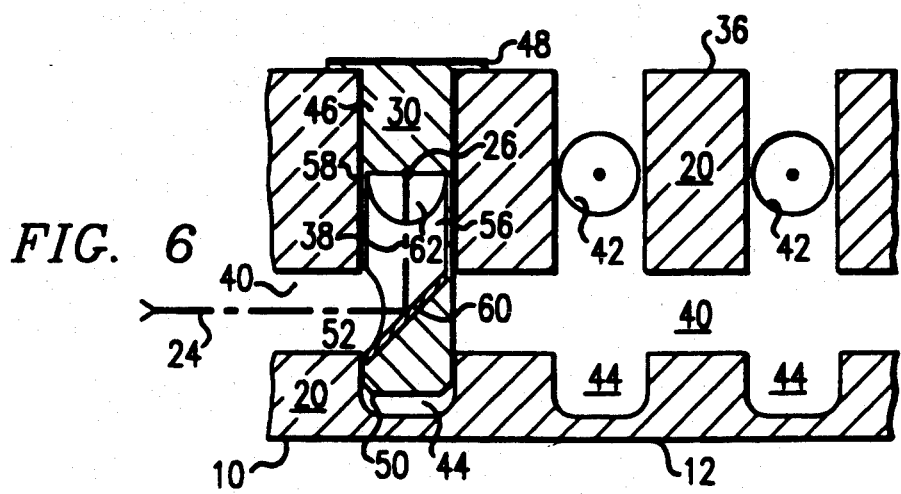
FIG. 6 shows the cross-sectional side view of the present invention defined by line 6—6 in FIG. 4.

FIGS. 4-6 illustrate a small portion of optical switch 10 which highlights the cooperation between a plug 30 and housing 12. FIG. 4 shows a projection view in which all three dimensions may be viewed. FIG. 5 shows a cross-sectional side view of the portion depicted in FIG. 4 along line 5—5. Likewise, FIG. 6 shows a cross-sectional side view of the portion shown in FIG. 5 along lines 6—6. Thus, FIGS. 5 and 6 illustrate two cross-sectional views through the center of a plug 30, taken at right angles to each other. The portion of switch 10 shown in FIGS. 4-6 represents any portion of switch 10. Consequently, lines of projection are simply referred to as lines of projection 24 and lines of incidence are simply referred to as lines of incidence 26.

FIG. 4 shows housing 12 as a solid, opaque material in which a plurality of openings have been formed. Specifically, projection openings 40 surround and are centered upon lines of projection 24, incidence openings 42 surround and are centered upon lines of incidence 26, and plug openings 44 are centered upon and surround intermediate lines 38. Consequently, projection openings 40 are substantially perpendicular to incidence openings 42 and plug openings 44, and incidence openings 42 are substantially perpendicular to plug openings 44. Moreover, in the preferred embodiment of the present invention, openings 40 and 42 are filled with air. The opaque material from which housing 12 is constructed prevents light propagating in openings 40 and 42 from dispersing so that it interferes with nonconnected ports of switch 10.

Referring to FIGS. 5 and 6 together, a single plug 30 is shown inserted in a single one of plug openings 44. Plug 30 includes a body portion 46 and a head portion 48. In the preferred embodiment, plug openings 44 represent cylindrically shaped openings which extend from top surface 36 of housing 12 into interior 20 of housing 12 for a predetermined depth. This predetermined depth may represent the entire thickness of housing 12. Body 46 of plug 30 is a cylindrically shaped object which has a length less than the predetermined depth of opening 44. Moreover, the diameter of body 46 is slightly smaller than the diameter of opening 44 so that body 46 is easily inserted into and removed from opening 44.

Head 48 of plug 30 resides at one end of plug body 46 and is a cylindrically shaped plate which has a diameter greater than the diameter of plug opening 44. Thus, body 46 of plug 30 fits within openings 44, but head 48 cannot fit within an opening 44. Consequently, the depth to which plug 30 is inserted into openings 44 is controlled by head 48 abutting against top surface 36 of housing 12. In other words, plug 30 may be inserted into any one of openings 44, and the depth to which plug 30 is inserted into an opening 44 remains constant so long as head 48 abuts against top surface 36 of housing 12. In addition, a tapered end 50 of body 46 opposes head 48 of plug 30. Tapered end 50 of plug 30 aids the alignment of plug 30 with a plug opening 44 as plug 30 is being inserted into an opening 44.

Moreover, plug 30 includes a projection window 52, which is depicted in FIG. 6, and an incidence window 54, which is depicted in FIG. 5. An interior portion 56 of plug 30 is substantially filled with air between windows 52 and 54. Windows 52 and 54 represent openings through a wall 58 of plug body 46. When plug 30 is fully inserted within an opening 44, window 52 faces and is aligned with projection opening 40, and window 54 faces and is aligned with incidence opening 42.

In the preferred embodiment, projection openings 40 have about the same cross-sectional area as incidence openings 42. However, plug openings 44 have a larger cross-sectional area than either of projection openings 40 or incidence openings 42. This allows body 46 of plug 30 to be slightly larger in diameter than the diameters of projection and incidence openings 40 and 42. Thus, each of windows 52 and 54 represent circular openings in wall 58, wherein the circle diameter is slightly larger than the diameters of projection openings 40 and incidence openings 42. Since window 52 is slightly larger than openings 40 and 42, substantially all light propagating through opening 40 at plug 30 may enter interior 56 of plug 30 through projection window 52.

A first reflecting surface or mirror 60 resides at approximately a 45° angle to both line of projection 24 and intermediate line 38 within interior 56 adjacent to window 52. Mirror 60 is a substantially flat surface which is constructed to reflect substantially all light impinging thereon. Consequently, light propagating in projection opening 40 is reflected upward within interior 56 of plug 30 in the direction of intermediate line 38.

Plug 30 additionally includes a second reflecting surface or mirror 62, which resides within interior 56 adjacent to window 54. Mirror 62 represents a substantially flat surface which is constructed to reflect substantially all light impinging thereon. In addition, mirror 62 resides at substantially a 45° angle to both intermediate line 38 and line of incidence 26. However, since line of incidence 26 is perpendicular to line of projection 24, mirror 62 does not parallel mirror 60.

Light which has been reflected upward in the direction of intermediate line 38 from mirror 60 impinges upon mirror 62 and is again reflected. Mirror 62 causes such light to exit window 54 of plug 30 and propagate along line of incidence 26. Since window 54 is slightly larger than incidence opening 42, a maximum amount of light is coupled from interior 56 of plug 30 to incidence opening 42. Such light then propagates along line of incidence 26 through incidence opening 42 until it impinges upon one of receivers 16a-16n (see FIG. 1).

Since mirrors 60 and 62 represent substantially flat surfaces in the preferred embodiment, plug 30 is rotationally aligned within plug opening 44 so that windows 52 and 54 are aligned with projection opening 40 and incidence opening 42, respectively. This permits a maximum amount of light to be coupled from projection opening 40, through interior 56 of plug 30, to incidence opening 42. The preferred embodiment of the present invention rotationally aligns plug 30 with respect to visual indicia openings 40 and 42 of housing 12 using an alignment notch 64 and a tapered rotational alignment pin 66, as shown in FIG. 5. Alignment notch 64 resides in housing 12, adjacent to plug openings 44 at top surface 36 for each of plug openings 44. Tapered pin 66 resides on head 48 of plug 30 and may be an integral part thereof. Tapered pin 66 tapers from a point 68 which extends downward from head 48 toward end 50 of plug 30, to a base 70 of pin 66 which resides adjacent to head 48. Base 70 is approximately the same size or slightly smaller than notch 64. Consequently, so long as plug 30 is rotationally aligned close enough so that point 68 of pin 66 enters notch 64 of housing 12 as plug 30 is being inserted into plug opening 44, a tapered wall 72 of pin 66 causes plug 40 to rotate into proper alignment with housing 12 as plug 30 is inserted into opening 44. The rotation occurs as tapered wall 72 slides against a wall of notch 64.

The present invention contemplates the use of conventional robotic and industrial control techniques to insert and remove a plug 30 from plug openings 44 in accordance with a current connection definition for switch 10. Such techniques are well known and are not discussed further herein. Moreover, the embodiment presented herein relies upon gravity to maintain a plug 30 properly positioned within a plug opening 44. However, nothing in the present invention prevents housing 12 from being mounted vertically rather than horizontally as shown in the Figures. If housing 12 is mounted vertically, other techniques, such as a magnetic coupling between head 48 of plug 30 and housing 12, may be utilized to maintain plug 30 properly coupled to housing 12. Such magnetic coupling may be accomplished by having one of head 48 or the top surface of housing 12 magnetized. Thus, once installed, plug 30 tends to remain in place due to magnetic attraction between head 48 and housing 12. Still further, optical switch 10 as shown in the Figures may be enclosed within another enclosure to further eliminate interference of light originating from sources other than transmitters 14a-14n (see FIG. 1).

In summary, the present invention provides an optical switch which utilizes an air medium to propogate and switch optical signals from input ports to output ports. The use of an air medium results in a highly reliable and low cost switching structure. The use of an air medium causes the optical signals propagating therethrough to diverge much more than occurs when fiber optics are used to transmit optical signals. This large divergence causes a significant loss of optical signal amplitude between a transmitter and a receiver in the optical switch. However, the structure of the present invention minimizes cross talk between nonconnected input and output ports by radiating optical signals through individual openings associated with each port. Moreover, since separate planes are utilized to accommodate the input and output ports, cross talk is reduced still further. Consequently, the preferred embodiment of the present invention may experience a significant amount of signal loss between an optical transmitter and an optical receiver without impacting the signal to noise ratio associated with the data being transmitted through optical switch 10.

The foregoing description uses a preferred embodiment to describe the present invention. However, those skilled in the art will recognize that many changes and modifications may occur to this preferred embodiment without departing from the inventive concept presented herein. For example, lines of projection could reside in an upper plane while lines of incidence would reside in a lower plane. This and other changes and modifications which are obvious to those skilled in the art are intended to be included within the scope of the present invention.

What is claimed is:

1. An optical switch comprising:
   a housing having an interior;
   a plurality of optical transmitters mounted on said housing so that light from said transmitters radiates into said interior of said housing substantially along lines of projection in a first plane, wherein each line of projection is associated with one of said transmitters;
   a plurality of optical receivers mounted on said housing so that light received by said receivers approaches from said interior of said housing substantially along lines of incidence in a second plane, wherein each line of incidence is associated with one of said receivers and each of said lines of incidence crosses each of said lines of projection within said interior of said housing at a cross point, and said first and second planes do not intersect within said housing interior;
   means, demountably coupled to said housing at one of said cross points, for reflecting light from one of said lines of projection to one of said lines of incidence; and
   means for aligning said reflecting means so that light from said transmitters along said lines of projection is substantially reflected along said lines of incidence.

2. An optical switch as claimed in claim 1 wherein:
   said transmitters are mounted so that said lines of projection substantially parallel each other; and
   said receivers are mounted so that said lines of incidence substantially parallel each other.

3. An optical switch as claimed in claim 2 wherein said transmitters and receivers are mounted so that said lines of projection are substantially perpendicular to said lines of incidence.

4. An optical switch as claimed in claim 1 wherein said interior of said housing comprises a opaque material having a plurality of projection openings, wherein each of said projection openings is substantially centered around one of said lines of projection, and having a plurality of incidence openings, wherein each of said incidence openings is substantially centered around one of said lines of incidence.

5. An optical switch as claimed in claim 4 wherein:
   said transmitters are mounted so that said lines of projection substantially reside in a first plane; and
   said receivers are mounted so that said lines of incidence substantially reside in a second plane which does not intersect said first plane within said interior of said housing.

6. An optical switch as claimed in claim 5 wherein said first and second planes reside substantially parallel to each other, and said housing additionally includes plug openings substantially centered on said cross points so that one plug opening is associated with each cross point and said plug openings extending into said interior of said housing so that each of said plug openings is substantially perpendicular to said first and second planes.

7. An optical switch as claimed in claim 6 wherein said reflecting means comprises a reflective plug having a first mirror within a hollow interior portion of said plug adjacent to a first window of said plug and a second mirror within said hollow interior portion of said plug adjacent to a second window of said plug.

8. An optical switch as claimed in claim 7 additionally comprising means for rotationally aligning said plug within a first one of said plug openings located at said one of said cross plains so that said first window faces said one of said projection openings, and so that said second window faces said one of said incidence openings, and additionally comprising means for controlling the depth of insertion of said plug into said first plug opening so that said first window is aligned with said one of said projection openings and said second window is aligned with said one of said incidence openings.

9. An optical switch as claimed in claim 8 wherein said first window of said plug has a cross sectional area which is larger than the cross sectional area of said one of said projection openings so that substantially all light propagating in said one of said projection openings at said plug impinges upon said first mirror.

10. An optical switch as claimed in claim 9 wherein:
    said first mirror is mounted within said plug at substantially a 45° angle to both said one of said projection openings and said first plug opening; and
    said second mirror is mounted within said plug at a substantially a 45° angle to both said first plug opening and said one of said incidence openings.

11. An optical switch as claimed in claim 1 wherein said alignment means comprises:
    a protruding element coupled to said reflecting means; and
    a notch on said housing for coupling and receiving said protruding element, so that when said protruding element is received within said notch, said reflecting means is in alignment.

12. An optical switch as claimed in claim 11, further comprising robotic means for coupling and decoupling said reflecting means, said robotic means couples said reflecting means to said housing.

13. An optical switch comprising:
a housing defining first and second plurality of passageways, said first and second plurality of passageways residing in first and second planes and intersecting at cross points; and light reflecting means demountably coupled to said housing at selected cross points for optically joining selected first passageways to selected second passageways, so that each of said first passageways is joined to only one of said second passageways.

* * * * *